US012321792B2

(12) United States Patent
Bentley (10) Patent No.: US 12,321,792 B2
(45) Date of Patent: *Jun. 3, 2025

(54) SERVERLESS PROPERTY STORE (71) Applicant: Bentley Systems, Incorporated, Exton, PA (US)

(72) Inventor: Keith A. Bentley, Elverson, PA (US)

(73) Assignee: Bentley Systems, Incorporated, Exton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/097,951

(22) Filed: Jan. 17, 2023

(65) Prior Publication Data

US 2024/0241772 A1 Jul. 18, 2024

(51) Int. Cl.
*G06F 9/54* (2006.01)
*H04L 67/00* (2022.01)
(Continued)

(52) U.S. Cl.
CPC ............ *G06F 9/54* (2013.01); *H04L 67/1095* (2013.01); *H04L 67/34* (2013.01); *H04L 67/568* (2022.05)

(58) Field of Classification Search
CPC ..................................... G06F 1/32; G06F 9/44
See application file for complete search history.

(56) References Cited

U.S. PATENT DOCUMENTS 7,386,797 B1 6/2008 Chatterjee et al.
7,587,467 B2 9/2009 Hesselink et al.
(Continued)

FOREIGN PATENT DOCUMENTS

AU 2014249680-B2 3/2017
CN 101345659 A 1/2009
(Continued)

OTHER PUBLICATIONS

"Bentley Building Application Deployment Guide: ProjectWise Managed Workspaces," Bentley Systems, Incorporated, Bentley Building Development Guide, ProjectWise Managed Workspace, Version 1.1, v8i (SELECTseries 1) release, Nov. 2009, pp. 1-38.
(Continued)

*Primary Examiner* — Keshab R Pandey
(74) *Attorney, Agent, or Firm* — Cesari and McKenna, LLP; James A. Blanchette (57) ABSTRACT

In example embodiments, techniques are described for implementing serverless property stores to hold properties that persist application customization data, such as settings. A serverless property store employs an "edge base" paradigm, wherein an edge computing device executes a property store service that maintains a local, periodically-synchronized copy of a portion of a database that stores properties (i.e., a local property cache"). A cloud container of a blob storage service of a cloud datacenter maintains a master copy of the database (i.e., a "property store database"). Read operations on a client computing device may be performed against the local property cache. Write operations may likewise be performed against the local property cache, however, they may be serialized via a write lock maintained in the cloud container. Multiple serverless property stores may be employed to store different properties each having different scopes.

28 Claims, 4 Drawing Sheets

(51) Int. Cl.
*H04L 67/1095* (2022.01)
*H04L 67/568* (2022.01)

(56) References Cited

U.S. PATENT DOCUMENTS

| | | | |
|---|---|---|---|
| 7,647,614 | B2 | 1/2010 | Krikorian et al. |
| 8,139,585 | B1 | 3/2012 | Mangal |
| 8,549,473 | B2 | 10/2013 | Dotan et al. |
| 8,972,962 | B2 | 3/2015 | Becker et al. |
| 9,521,040 | B2 | 12/2016 | Vergara et al. |
| 9,537,894 | B1 | 1/2017 | Kuscher et al. |
| 10,382,262 | B1 | 8/2019 | Gupta et al. |
| 10,482,063 | B2 | 11/2019 | Maturana et al. |
| 10,530,935 | B1 | 1/2020 | Britt et al. |
| 11,064,047 | B1 | 7/2021 | Stegall et al. |
| 11,082,361 | B2 | 8/2021 | Laplanche et al. |
| 11,347,555 | B2 | 5/2022 | Lee et al. |
| 11,425,054 | B1 | 8/2022 | Dunsmore et al. |
| 11,425,187 | B2 | 8/2022 | Sodagar |
| 11,558,251 | B1 | 1/2023 | Luthra et al. |
| 11,762,850 | B2 | 9/2023 | Rupprecht et al. |
| 11,936,741 | B2 | 3/2024 | Bentley |
| 2004/0261076 | A1 | 12/2004 | Kondo |
| 2007/0143357 | A1 | 6/2007 | Chaudhri |
| 2008/0306976 | A1 | 12/2008 | Agbeblewu et al. |
| 2010/0131470 | A1 | 5/2010 | Schmidt |
| 2012/0197973 | A1 | 8/2012 | Tukol et al. |
| 2013/0067388 | A1 | 3/2013 | Celie et al. |
| 2014/0122897 | A1 | 5/2014 | Dodeja et al. |
| 2014/0280484 | A1 | 9/2014 | Klemenz et al. |
| 2015/0088942 | A1 | 3/2015 | Shah |
| 2015/0222517 | A1 | 8/2015 | McLaughlin et al. |
| 2015/0319252 | A1 | 11/2015 | Momchilov et al. |
| 2016/0132314 | A1 | 5/2016 | Solsona-Palomar et al. |
| 2016/0179850 | A1 | 6/2016 | Martin et al. |
| 2017/0052776 | A1 | 2/2017 | Kotian |
| 2017/0090904 | A1 | 3/2017 | Shida et al. |
| 2017/0171201 | A1 | 6/2017 | Matsugashita |
| 2017/0371895 | A1 | 12/2017 | Shaw et al. |
| 2018/0039453 | A1 | 2/2018 | Nakajima et al. |
| 2018/0062956 | A1 | 3/2018 | Schultz et al. |
| 2018/0095739 | A1 | 4/2018 | Baset et al. |
| 2018/0348007 | A1* | 12/2018 | Adachi ............... G01C 21/203 |
| 2020/0019411 | A1 | 1/2020 | Nadella et al. |
| 2020/0118303 | A1 | 4/2020 | Connelly et al. |
| 2022/0103338 | A1 | 3/2022 | Brooker et al. |
| 2022/0188092 | A1* | 6/2022 | Liu ............................ G06F 8/20 |
| 2022/0197306 | A1 | 6/2022 | Cella et al. |
| 2022/0334725 | A1 | 10/2022 | Mertes et al. |
| 2023/0006890 | A1 | 1/2023 | Allsbrook et al. |

FOREIGN PATENT DOCUMENTS

| | | |
|---|---|---|
| CN | 103714186 A | 4/2014 |
| CN | 104484195 A | 4/2015 |
| CN | 105593816 A | 5/2016 |
| CN | 106406846 A | 2/2017 |
| CN | 107690615 A | 2/2018 |
| CN | 107844352 A | 3/2018 |
| CN | 109343907 A | 2/2019 |
| CN | 105637481 B | 12/2019 |
| CN | 106406846 B | 2/2020 |
| CN | 111158788 A | 5/2020 |
| CN | 113692309 A | 11/2021 |
| CN | 113710339 A | 11/2021 |
| CN | 114116064 A | 3/2022 |
| EP | 3401806 A1 | 11/2018 |
| JP | 2522898 B2 | 8/1996 |
| JP | 2013186518 A | 9/2013 |
| JP | 2018511880 A | 4/2018 |
| JP | 2020102149 A | 7/2020 |
| JP | 2022036800 A | 3/2022 |
| KR | 20220061926 A | 5/2022 |
| WO | WO-2019037416 A1 | 2/2019 |
| WO | WO-2021069905 A1 | 4/2021 |
| WO | WO-2022/016102 A1 | 1/2022 |
| WO | WO-2022/221719 A2 | 10/2022 |

OTHER PUBLICATIONS

"Dynamic Managed Workspace: Dynamic Managed Workspace Introduction," Bentley Systems, Incorporated, Bentley Communities, ProjectWise, ProjectWise Design Integration Wiki, Oct. 5, 2021, pp. 1-4.

U.S. Appl. No. 17/869,214, filed Jul. 20, 2022 by Keith A. Bentley for Workspace Databases, pp. 1-28.

U.S. Appl. No. 18/076,922, filed Dec. 7, 2022 by Keith A. Bentley et al. for Serverless Code Service, pp. 1-28.

"Workspaces," Bentley Systems, Incorporated, ProjectWise Administrator Online Help, Nov. 4, 2021, pp. 1-51.

"Notification of Transmittal of the International Search Report and the Written Opinion of the International Searching Authority, or the Declaration," International Filing Date: Dec. 5, 2023, International Application No. PCT/US2023/082557, Date of Mailing: Feb. 27, 2024, pp. 1-15.

"Notification of Transmittal of the International Search Report and the Written Opinion of the International Searching Authority, or the Declaration," International Filing Date: May 30, 2023, International Application No. PCT/US2023/023864, Date of Mailing: Sep. 6, 2023, pp. 1-13.

"Notification of Transmittal of the International Search Report and the Written Opinion of the International Searching Authority, or the Declaration," International Filing Date: Jan. 16, 2024, International Application No. PCT/US2024/011637, Date of Mailing: May 24, 2024, pp. 1-14.

* cited by examiner

SERVERLESS PROPERTY STORE

BACKGROUND

Technical Field

The present disclosure relates generally to customizing sessions of software applications, for example, sessions of applications used in a digital twin software architecture.

Background Information

Throughout the design, construction, and operation of infrastructure (e.g., buildings, factories, roads, railways, utility networks, etc.) it is often desirable to create digital twins. Digital twins may federate together data, breaking down product/disciple/phase data silos, to produce unified digital representations usable across the lifecycle of infrastructure. Portions of digital twins are often persisted in infrastructure models, which describe entities in the physical world using corresponding elements in the digital world.

A variety of software applications have been developed to allow users to create, modify, view, or otherwise interact with digital twins. Users typically operate such applications during user sessions (or simply "sessions") that begin, for example, when a user executes the application or loads a project therein, and end when the user quits the application or exits the project. A user's experience in the session may be customized based on application customization data, such as settings. Examples of settings include user preferences, recently used tools or tool configurations, recently used infrastructure models or views thereof, and user interface states, among a variety of other items. Settings may have various scopes. For example, while some settings may apply to the application in general, other settings may be digital twin or infrastructure model specific. Likewise, settings may be applicable to all users or specific to a particular user or group of users.

Settings typically exist only in memory when a session is active and must be persisted between sessions (i.e. stored and loaded) using some other technique. In theory, settings that are digital twin or infrastructure model-specific could be persisted in an infrastructure model itself. However, in practice, this is problematic since the transaction model for infrastructure design data typically is quite different than that of settings, and it may be undesirable to commit new versions of an infrastructure model each time a setting is to be stored.

Settings could be persisted separate from infrastructure models in a dedicated enterprise database on a server deployed on-premises or in the cloud via platform as a service (PaaS). However, deployments using an on-premises server or PaaS server generally suffer many drawbacks. For example, such deployments lack scalability, and may be unreliable. No matter how large the server, a single instance may never be able to scale to handle all requests from all clients of all digital twins in all the world. Likewise, a single server presents a single-point-of-failure. Further, such deployments may be expensive to implement. Enterprise databases are resource-hungry, requiring fast processors, many levels of caching and large memory profiles, which are typically available only at high cost. Additionally, where the enterprise database is implemented as a "multi-tenant" database to address spin up/spin down overhead, there may be challenges related to security (ensuring clients may only access their own settings data) and data residency (guaranteeing settings data resides within a particular geographical boundary). Still further, it may be burdensome to ensure transactional consistency with traditional solutions. Since an enterprise database is a shared resource, the server typically batches additions, deletions and modification, and pages reads, to provide equitable balancing, leading to transactions of clients becoming intermingled. Maintaining transactional consistency with many intermingled transactions may be complicated and adversely affect performance. It should be understood that there may be a wide variety of additional drawbacks of persisting settings in an enterprise database on a server deployed on-premises or in the cloud via PaaS.

Accordingly, there is a need for improved techniques for persisting application customization data, such as settings.

SUMMARY

In various example embodiments, techniques are described for implementing one or more serverless property stores to hold key/value pairs (referred to herein as "properties") that persist application customization data, such as settings. Rather than use a dedicated enterprise database on a server, a serverless property store employs an "edge base" paradigm, wherein an edge computing device (e.g., a client computing device or virtual machine (VM)) executes a property store service that maintains a local, periodically-synchronized copy of a portion of a database that stores properties (referred to herein as a "local property cache"). A cloud container of a blob storage service of a cloud datacenter may maintain a master copy of the database (referred to herein as a "property store database"). Read operations on a client computing device may be performed against the as-of-last-synchronization local property cache. Write operations may likewise be performed against the local property cache, however, they may be serialized via a write lock maintained in the cloud container that permits only a single client computing device to perform writes at a time. Multiple serverless property stores may be employed to store different properties each having different scopes, including subject matter-based scopes (e.g., digital twin or infrastructure model specific scopes) and/or user-based scopes (e.g., single user or group of user specific scopes).

In contrast to server-based enterprise database deployments, serverless property stores may provide improved scalability (e.g., since reads never affect reads or writes of applications on other client computing devices, and writes are dependent only on the number of simultaneous writers and not significantly affected by transaction size). Reliability may be improved as there is no single server to fail, reads can sometimes proceed without cloud connectivity (e.g., reads can continue to occur from a local property cache even if the property store database is not accessible), and blob storage may support automatic version tracking that can reverse unwanted changes. Further, since blob storage is typically the cheapest offering of a cloud datacenter, cost may be decreased. Spin up/spin down overhead may be limited to the creation and deletion of the cloud container, and data residency may be readily enforced by siting the cloud container in blob storage of a particular geographical region. Still further, transactional consistency may be ensured in a simplified manner without significant performance impacts. It should be understood that there may be a large number of additional advantages of serverless property stores and that this listing merely highlights some of their desirable properties.

In one example embodiment, a serverless property store is provided to persist application customization data. When a local property cache is not already in use on an edge computing device (e.g., a client computing device or VM), a property store service obtains a token for accessing a cloud container maintained by a cloud datacenter and downloads a manifest for a property store database maintained in the cloud container to create a local manifest on the edge computing device. Subsequently, upon receiving one or more requests from a module of an application executing on the client computing device for a property that maintains the application customization data (the requests including a property name), the property store service reads a value of the property corresponding to the property name from the local property cache, and supplies the value of the property to the module of the application.

In another example embodiment, a serverless property store is provided to persist application customization data. To enable writing, a property store service on an edge computing device (e.g., a client computing device or VM) obtains a write lock from a cloud container maintained by a cloud datacenter and downloads a manifest from the cloud container to update a local manifest on the edge computing device. The property store service then receives one or more requests from a module of an application to add, delete or modify properties that maintain application customization data. The property store service downloads any blocks affected by the request that are not already local from the property store database to the local property cache. The property store service then writes to the local property cache to add, delete, or modify one or more blocks of the local property cache, and records such additions, deletions, or modifications to create an updated local manifest. Added or modified blocks are uploaded to the property store database, and the updated local manifest is uploaded to replace the manifest in the cloud container. Thereafter, the property store service releases the write lock back to the cloud container.

In still another example embodiment, an edge computing device (e.g., a client computing device or VM) is configured to persist application customization data. The edge computing device has a processor and a memory coupled to the processor. The memory is configured to maintain a local property cache for storing a portion of a property store database of a cloud container, a local manifest for the local property cache produced from a manifest in the cloud container, and software for a property store service. The software for the property store service when executed on the processor is operable to service one or more requests from a module of an application for a property by downloading from the property store database to the local property cache any blocks indicated in the local manifest required to read the property that are not already local in the local property cache, reading the local property cache, and supplying at least a value of the property from the local property cache to the module of the application. The software for the property store service is further operable to service one or more requests from the application to add, delete or modify the property by obtaining a write lock, downloading the manifest from the cloud container to update the local manifest, writing to the local property cache to add, delete, or modify one or more blocks of the local property cache and recording such additions, deletions, or modifications to create an updated local manifest, uploading added or modified blocks to the property store database and uploading the updated local manifest to replace the manifest in the cloud container, and releasing the write lock back to the cloud container.

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which.

DETAILED DESCRIPTION

Figure 1:
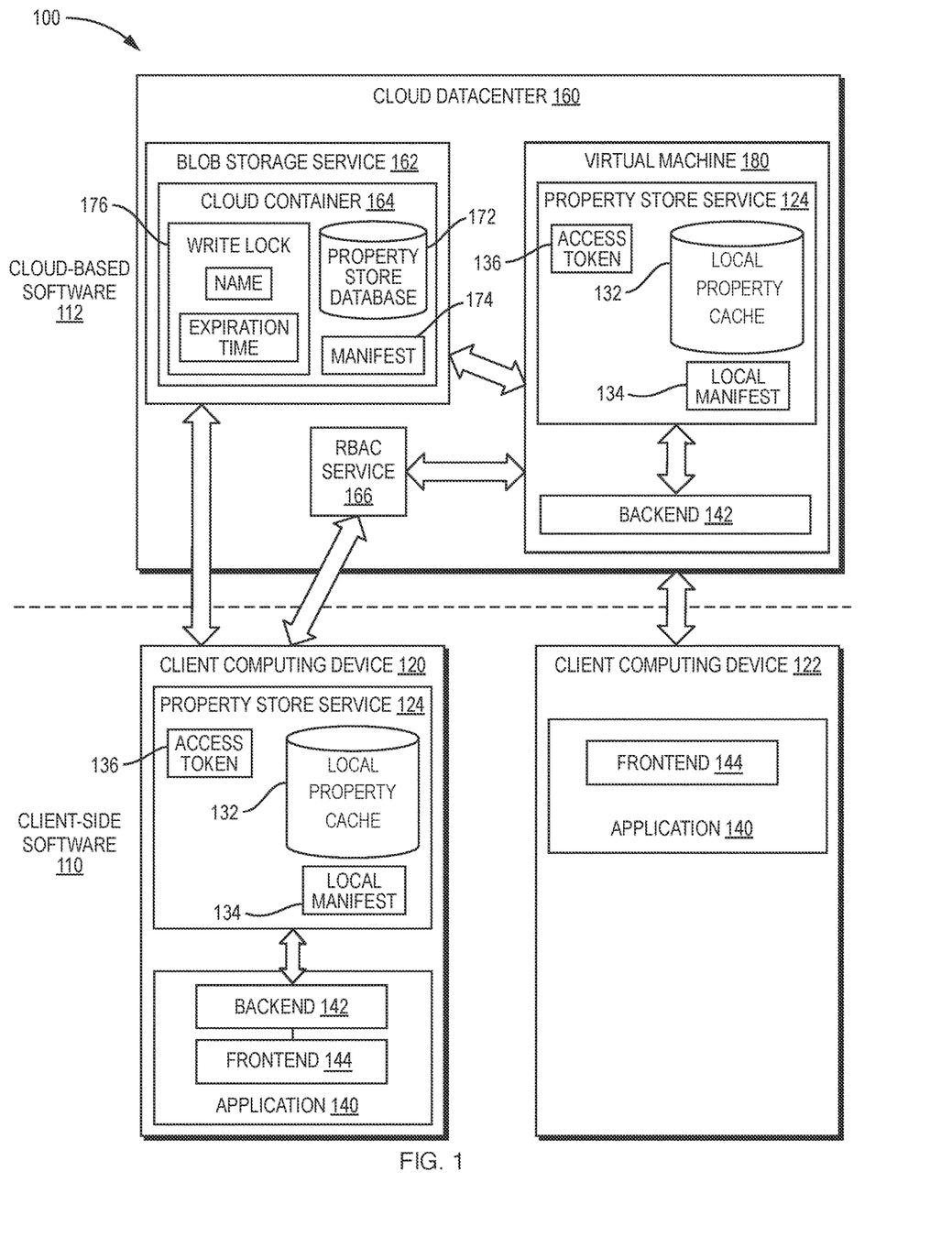
FIG. 1 is a high-level block diagram of an example software architecture in which serverless property stores may be implemented.

FIG. 1 is a high-level block diagram of an example software architecture 100 in which serverless property stores may be implemented. The architecture may be divided into client-side software 110 that executes on client computing devices 120, 122 and cloud-based software 112 that executes on a cloud datacenter 160 accessible via a network (e.g., the Internet). Client computing devices 120, 122 may execute applications 140, for example, digital twin software applications that allow users to create, modify, view, or otherwise interact with digital twins during sessions. The cloud datacenter 160 may provide a blob storage service 162 that maintains at least one cloud container 164. The cloud datacenter 160 may also provide a role-based access control (RBAC) service 166 that provides tokens (e.g., shared access signature (SAS) tokens) that grant read and/or write permission to the cloud container 164. In some implementations, the cloud datacenter 160 may additionally provide a compute service for executing one or more VMs 180.

The applications 140 may be customized using application customization data, such as settings (e.g., user preferences, recently used tools or tool configurations, recently used infrastructure models or views thereof, user interface states, etc.). The application customization data (e.g., settings) may be persisted between sessions as properties (i.e. key/value pairs) maintained according to an "edge base" paradigm. One or more master databases (each referred to herein as a "property store database") may be maintained in the cloud container 164 to store properties, each property store database having a respective scope. Each edge computing device (e.g., client computing device 120 or VM 180) may execute one or more property store services 124 that each maintain a local, periodically-synchronized copy of a portion of a portion of a respective property store database (referred to herein as a "local property cache"). Each property store database may be divided into fixed size portions (e.g., 32 kilobyte (Kb) portions) referred to herein as "blocks" that are downloaded to the corresponding local property cache 132 on demand (or prefetched).

One or more property store services 124 may interact with backend modules 142 of applications 140. Where the application 140 is a digital twin application, a backend module 142 may be primarily concerned with administration, infrastructure model management, loading and creating elements and models, and related functions. The backend modules 142 may interact with frontend modules 142. Where the application 140 is a digital twin application, a front module 144 may be primarily concerned with providing a user interface for interacting with the digital twin. Depending on the nature of the edge computing device 120, 180, if there is a need to propagate values of properties to frontend modules 144, different mechanisms may be utilized.

For example, in the case where the edge computing device is a client computing device 120, a property store service 124 and local property cache 132, and the application 140 with its backend module 142 and frontend module 144, may all be executed on the same machine, either in a single process or in multiple processes. In a case where the edge computing device is a VM 180 of a cloud datacenter 160 (or another machine), a property store service 124, property store cache 132 and backend module 142 be resident in the cloud, and the frontend module 144 of the application 140 may be executed separately on a client computing device 122. Values of properties may be propagated as needed from the backend module 142 to the frontend module 144 directly or via inter-process communication (IPC) in the first case, or via remote procedure call (RPC) or representational state transfer (REST) application program interface (API) in the second case.

In either case, each property store service 124 may obtain a token (e.g., a SAS token) 136 from the RBAC service 166 that permits reading and/or writing to the cloud container 164. The cloud container 164 may maintain a manifest 174 indicating block identifier (IDs) of blocks of the property store database 172 (and synchronized local property caches). In one implementation, the block IDs may be a hash of their contents (e.g., a hash of the contents of the 32 Kb portions). Each property store service 124 may maintain a local manifest 134 derived from the manifest 174 as it stood at a time of last synchronization. That is, the local manifest 134 may include local changes to the local property cache 132 that have not yet been synchronized with the manifest 174, or may lack changes made by other property store services to the manifest 174 since a last synchronization. Synchronization may occur independent of block downloads from the property store database 172 or periodic block purging in the cloud container 164.

Read operations are performed by each property store service 124 against its local property cache 132. Among other functions, read operations may be utilized to load a property that persists application customization data, such as settings, such that a value thereof may be used to customize a user's experience in a session. Write operations are performed against each local property cache 132, serialized via a respective write lock 176 (e.g., a specially named blob) maintained in the cloud container 164 that permits only a single client computing device 120, 122 to modify the local property cache 132 at a time. A property store service 124 may obtain the write lock 176, download the manifest 172 from the cloud container 164 to refresh the local manifest 134, perform write operations on the local property cache 132 and update the local manifest, upload added or modified blocks to the property store database 172 and upload the updated local manifest 134 to replace the manifest 174 in the cloud container 164, and then release the write lock 176. Among other functions, write operations may be utilized to store a property that persists application customization data, such as settings, so that values of the settings may be persisted between sessions.

Figure 2:
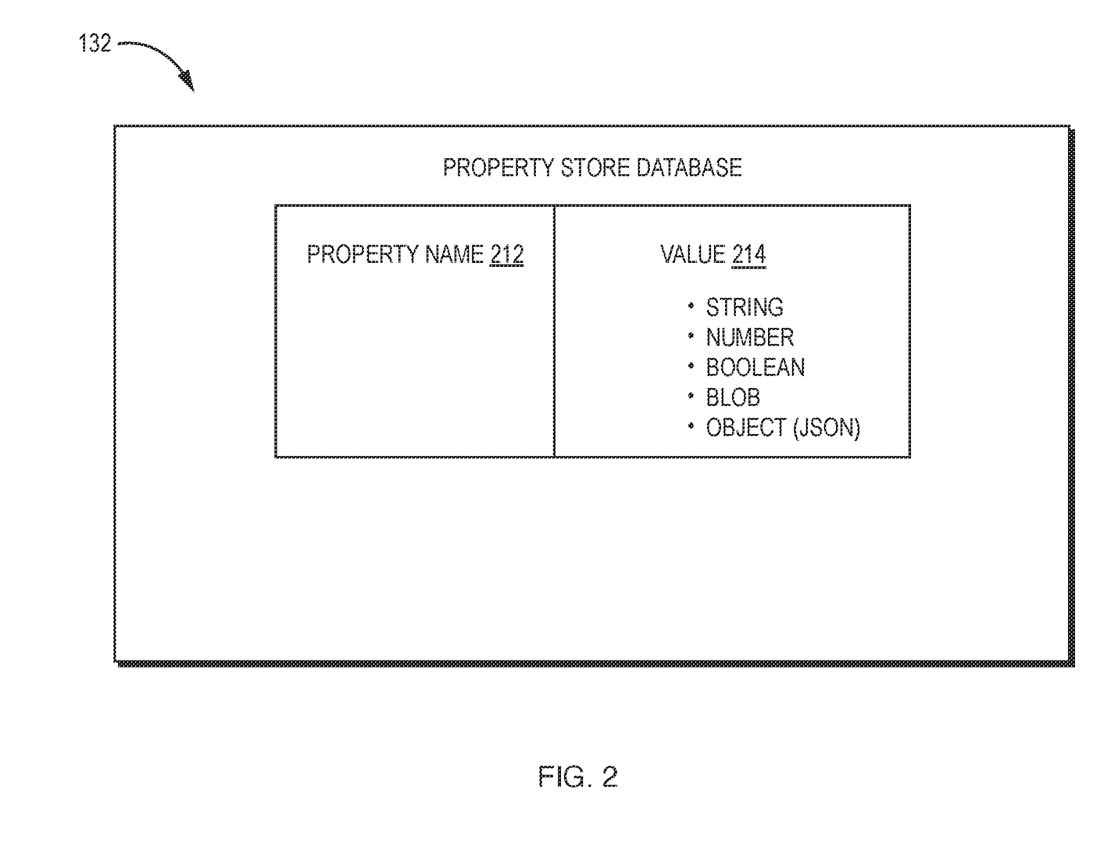
FIG. 2 is a diagram of an example property store database.

FIG. 2 is a diagram of an example property store database 172. The property store database 172 may be scoped based on subject matter and/or user, for example, to store properties for an entire digital twin, a single infrastructure model of a digital twin, a team of users of a digital twin, a team of users of a single infrastructure model of a digital twin, a single user of a digital twin, a single user of a single infrastructure model of a digital twin (so that properties may be shared among the users' multiple computers), or another scope. Use of multiple property store databases 132 of different scopes may enable fine-grain access control, and reduce the chance of write lock contention (e.g., since a user is granted a write lock 176 for the entire property store database 172).

The property store database 172 stores one or more properties that each include a property name 212 that serves as a key. The property name 212 is paired with a value 214 that indicates the desired customization. A property name 212 may be a unique sting that may have a length within a predetermined range (e.g., between 3 and 2048 characters) and may be subject to certain format restrictions (e.g., may not begin or end with a space). Applications 140 may organize property names according to parsing conventions. For example, property names 212 may be organized based on hierarchical conventions that define namespaces of increasing granularity, beginning from identifying the application and progressing to increasing granular functions or aspects thereof (e.g., "FliteGen/paths/run1" or "AlrViewer/symbology/lights/emf"). Additionally, URI-like conventions may be employed where parts of a property name 212 may identify individual members of a collection or options (e.g., "RtsSimualtion/scenario36/results/?excList{33,4}" or "SeismicRecord/?user="Frieda Green"&prot=1"). Such conventions may be implemented at the discretion of applications 140. Other than enforcing uniqueness, the property store service 124 typically does not interpret property names 212.

Each property name 212 is paired with a value 214 that indicates the desired customization. A value 214 may be of various types. For example, values may be strings, numbers (e.g., integer or real), booleans, blobs (e.g., binary data), objects (e.g., with named members having a type of string, number, boolean, nested object, or array thereof).

Figure 3:
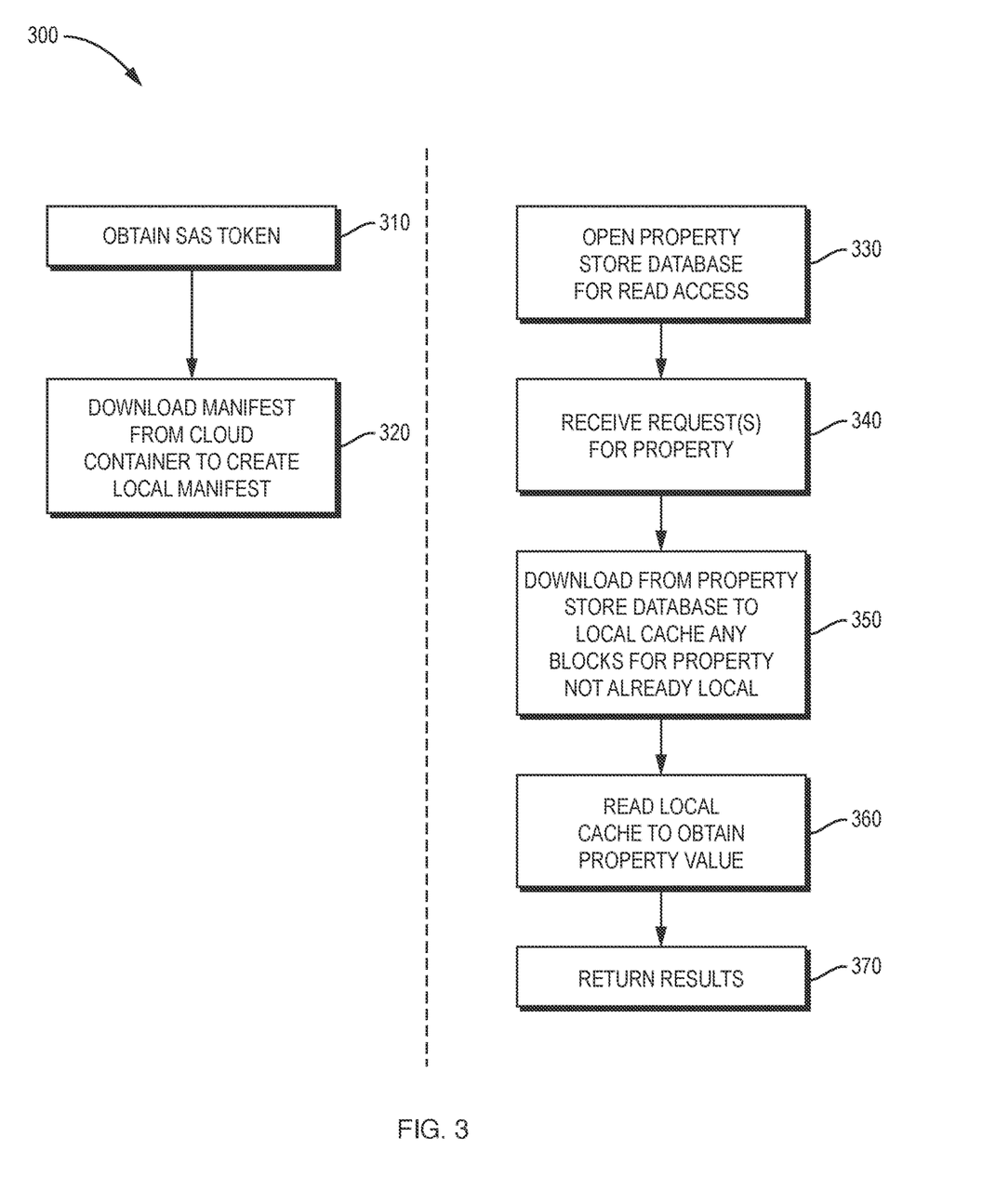
FIG. 3 is a flow diagram for an example sequence of steps for configuring access and performing read operations using a serverless property store.

FIG. 3 is a flow diagram for an example sequence of steps 300 for configuring access and performing read operations using a serverless property store. The sequence of steps 300 may assume a local property cache 132 of the property store service 124 is not already in use on the edge computing device (e.g., client computing device 120 or VM 180). If a property store service 124 is already in use, then steps 310-320 may be skipped.

At step 310, the property store service 124 may obtain a token (e.g., a SAS token) 136 from the RBAC service 166 that permits reading and/or writing to the cloud container 164. The token may have an expiration time, and the property store service 124 (during normal operation) may periodically refresh the token before it expires.

At step 320, the property store 124 may download the manifest 174 from the cloud container 164 to create a local manifest 134 on the edge computing device (e.g., client computing device 120 or VM 180) that includes a list of block IDs. This local manifest 134 will later be periodically (e.g., in response to a timer) or responsively (e.g., in response to a manual request from a user or a trigger, for instance when writes are to occur) refreshed (synchronized) to update it to reflect changes made by other client computing devices. Refreshes may involve redownloading the manifest 174 from the cloud container 164. It should be understood that downloading/redownloading the manifest 174 in and of itself does not cause any blocks of the property store database 172 to be downloaded. Blocks may be separately downloaded (e.g., on demand or via prefetching).

At step 330, which may occur at a subsequent time to step 320, a backend module 142 of an application 140 may open the local property cache 132 for read access.

At step 340, the property store service 124 may receive one or more requests from the backend module 142 of the application 140 for a property. A request may include a property name 212 that serves as a key in the property store database 172.

At step 350, the property store service 124 may download from the property store database 172 to the local property cache 132 any blocks indicated by block IDs in the local manifest 134 that are required to read the property but are not already local in the local property cache 132. If the needed block(s) are already resident in the local property cache 132, then nothing further may need to be downloaded.

At step 360, the property store service 124 may read the local property cache 132, for example, to obtain the value 214 of the property, for example, by looking up the property name 212 therein.

At step 370, the property store service 124 may return the value 214 of the property to the backend module 132 of the application 140. If the value of the property is needed by the frontend module 142, it may be passed directly (e.g., if they run in the same process on the same client computing device 120), by IPC (e.g., if they run in more than one process on the same client computing device 120), or via RPC or REST API (e.g., if they run on different computing devices, such as on a VM 180 and client computing device 122, respectively).

Figure 4:
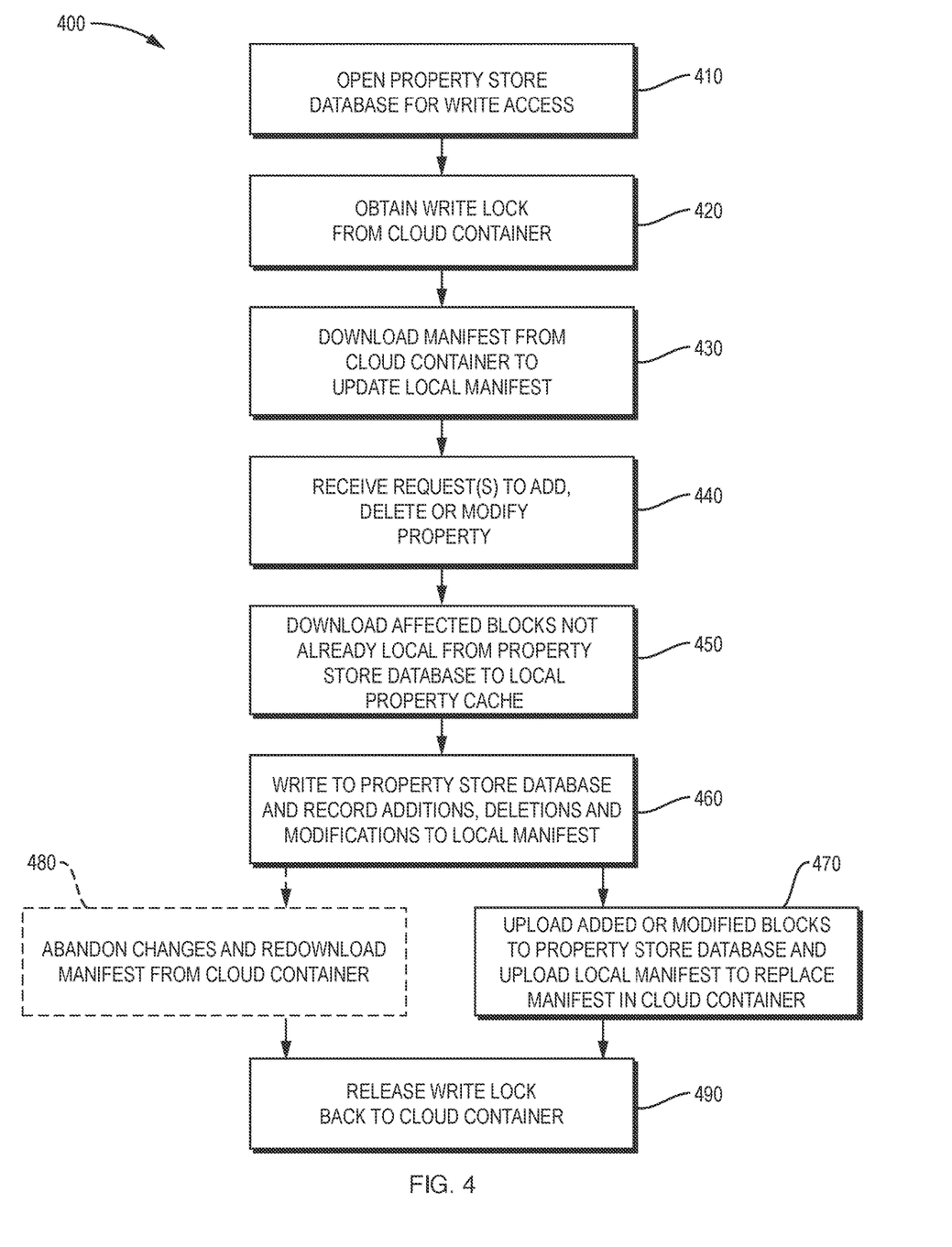
FIG. 4 is a flow diagram for an example sequence of steps for configuring access and performing write operations using a serverless property store.

FIG. 4 is a flow diagram for an example sequence of steps 400 for configuring access and performing write operations using a serverless property store. The sequence of steps 400 may assume a local property cache 132 is already in use on an edge computing device (e.g., client computing device 120 or VM 180), for example, as a result of performing reads. If a local property cache 132 is not already in use, then operations similar to steps 310-320 in FIG. 3 may be performed prior to the steps 400.

At step 410, the backend module 142 of the application 140 may open the local property cache 132 for write access.

At step 420, the property store service 124 may obtain the write lock 176 from the cloud container 164. The write lock 176 may be a specially named blob that holds the name of the client computing device 120, 122 that currently has write permission, and an expiration time for when it was obtained. To obtain the write lock 176, the property store service 124 may issue a request (e.g., a Hypertext Transfer Protocol (HTTP) GET request) to read the write lock 176. If the write lock 176 includes a non-null value for name, the expiration time value may be compared with the current time on the client computing device 120, 122 to determine if the write lock 176 is expired (i.e., the current time is past the expiration time value). If the write lock 176 includes a null value for name, or the write lock 176 includes a non-null value for name but is expired, the property store service 124 may add the name of the client computing device 120, 122 and set the expiration time to the current time on the client computing device 120, 122 via a request (e.g., an HTTP PUT request with HTTP If-Match). In this manner, if more than one client computing device 120, 122 simultaneously attempts to obtain the write lock 176 only one will succeed. If the write lock 176 includes a non-null value for name and has not expired, the property store service 124 may wait a predetermined time-out period and then repeat, issuing another request to read the write lock 176. If the write lock 176 has not been obtained after a predetermined number of attempts, the process may fail.

At step 430, the property store service 124 may download the manifest 174 from the cloud container 164 to update a local manifest 134 of the local property cache 132 on the edge computing device. This refreshes the local manifest 134 to reflect all changes made by other client computing devices since the local manifest 134 was last updated. Thereafter, writes may safely proceed.

At step 440, the property store service 124 may receive one or more requests from the backend 142 of an application 140 to add, delete, or modify properties. For example, a request may store application customization data (e.g., settings) currently in memory to persist them between sessions. The requests may take the form of database commands (e.g., SQL commands) such as INSERT, UPDATE, DELETE, etc. commands.

At step 450, the property store service 124 may automatically download from the property store database 172 to the local property cache 132 any blocks affected by the requests that are not already local.

At step 460, the property store service 124 may write to the local property cache 132 to add, delete, or modify one or more blocks of the local property cache 132 and record such additions, deletions, or modifications to the local manifest 134, creating an updated version thereof. All new blocks may be assigned a new ID (e.g., a hash of their content). Likewise, all modified blocks may be assigned a new ID (e.g., a hash of their updated content).

At step 470, the property store service 124 may upload the added or modified blocks to the property store database 172, and after all added or modified blocks have been uploaded may upload the updated local manifest 134 to replace the manifest 174 in the cloud container 164. The blocks may be uploaded in parallel, with retries, until all blocks are added to the property store database 172. Typically, the blocks of the property store database 172 are immutable. As such, when modified blocks are uploaded they are stored as new blocks with their own block ID (e.g., determined based on their contents), similar to added blocks. Likewise, blocks of the property store database 172 are typically not deleted independent of periodic purge operations (e.g., that may occur relatively infrequently, such as once per day). As such, old blocks whose block ID is no longer in the manifest 174 in the cloud container 164 may remain available until the next purge operation. An effect of such behavior is that even while block uploads are in progress, property store services on other client computing devices can safely read from the property store database 172 and will not see any changes. Even after the blocks are written and the manifest 174 in the cloud container 164 updated, property store service on other client computing devices can continue to use their now-stale local manifests, and access old blocks from their local property cache 132 or from the property store database 172 for a period of time. To see the changes, the property store services on the other client computing devices may periodically refresh (synchronize) their local manifests or trigger a responsive refresh (e.g., for instance as part of their own writes). After such a refresh, the property store services will then cease to utilize old blocks and begin to utilize new blocks created by the changes.

Further, since the cloud container 164 is typically maintained in blob storage of a blob storage service that supports automatic version tracking, should there be a need to undo the changes, and reverse added or modified blocks, the cloud container 164 can simply be rolled back to a previous version. Such cloud based versioning may be useful to roll back inadvertent or malicious changes to a property store database 172.

At alternative step 480, the property store service 124 may abandon the changes. In such case, the local manifest 134 is refreshed by redownloading the manifest 174 in the cloud container 164. If abandonment occur, then any changes are effectively undone by refreshing the local manifest 134.

At step 490, the property store service 124 releases the write lock 176 back to the cloud container 164. The property store service 124 may clear the name and expiration time via a request (e.g., an HTTP PUT request). If the property store service 124 should fail in some manner and not release the write lock 176, the write lock will eventually expire on its own due to the expiration time value, or may be manually released.

In summary, techniques are described herein for implementing serverless property stores that persist application customization data, such as settings. As discussed above, they may provide improved scalability, reliability, lower cost, decreased spin up/spin down overhead, geographical region assurance, and simplified guarantees of transactional consistency over server-based enterprise database deployments. It should be understood that there may be a large number of additional advantages. Likewise, it should be understood that a wide variety of adaptations and modifications may be made to the techniques describe herein to suit various implementations and environments. While it is discussed above that many aspects of the techniques may be implemented by specific software processes executing on specific hardware, it should be understood that some or all of the techniques may also be implemented by different software executing on different hardware and stored in a variety of non-transitory computer readable media. In addition to general-purpose computing devices, the hardware may include specially configured logic circuits and/or other types of hardware components. Above all, it should be understood that the above descriptions are meant to be taken only by way of example.

What is claimed is:

1. A method for persisting application customization data, comprising:
when a local property cache is not already in use on an edge computing device,
obtaining, by a property store service executing on the edge computing device, a token for accessing a cloud container maintained by a cloud datacenter, and
downloading, by the property store service, a manifest for a property store database maintained in the cloud container to create a local manifest on the edge computing device;
refreshing, by the property store service, the local manifest to enable the property store service to see changes made by other property store services to the property store database, the refreshing to redownload the manifest from the cloud container to synchronize the local property cache with the property store database;
receiving one or more requests from a module of an application executing on a client computing device for a property that maintains the application customization data, the request including at least a property name;
reading, by the property store service, a value of the property corresponding to the property name from the local property cache; and
supplying the value of the property to the module of the application.

2. The method of claim 1, further comprising:
prefetching, by the property store service from the property store database to the local property cache, one or more blocks that are required to read the property prior to receiving the one or more requests for the property.

3. The method of claim 1, further comprising:
in response to the receiving one or more requests, downloading, by the property store service from the property store database to the local property cache, one or more blocks indicated in the local manifest that are required to read the property and not already in the local property cache.

4. The method of claim 1, wherein the edge computing device is the client computing device, the module of the application is a backend module, the property store service, the backend module, and a frontend module of the application are all executed on the same client computing device, either in a single process or in multiple processes, and the method further comprises:
passing the value of the property from the backend module to the frontend module directly or via inter-process communication (IPC).

5. The method of claim 1, wherein the edge computing device is a virtual machine (VM) of the cloud datacenter, the module of the application is a backend module executed on the VM, a frontend module of the application is executed on the client computing device, and the method further comprises:
passing the value of the property from the backend module to the frontend module via a remote procedure call (RPC) or representational state transfer (REST) application program interface (API).

6. The method of claim 1, further comprising:
obtaining, by the property store service from the cloud container, a write lock;
downloading, by the property store service, the manifest from the cloud container to update the local manifest;
receiving, by the property store service, one or more requests from the module of the application to add, delete or modify properties;
downloading any blocks affected by the request that are not already local from the property store database to the local property cache;
writing, by the property store service, to the local property cache to add, delete, or modify one or more blocks of the local property cache, and recording such additions, deletions, or modifications in the updated local manifest;
uploading, by the property store service, added or modified blocks to the property store database, and uploading the updated local manifest to replace the manifest in the cloud container; and
releasing the write lock back to the cloud container.

7. The method of claim 6, further comprising:
assigning each added or modified block a new block identifier (ID) in the updated local manifest,.
wherein the uploading the updated local manifest adds new block IDs to the manifest in the cloud container and removes block IDs of deleted blocks from the manifest in the cloud container.

8. The method of claim 7, further comprising:
maintaining old blocks whose block ID is no longer in the manifest in the cloud container until a purge operation is periodically performed.

9. The method of claim 7, wherein the new block ID is a hash of contents of the added or modified block.

10. The method of claim 6, further comprising:
undoing changes to the property store database made by the added or modified blocks by rolling back the cloud container to a prior version using version tracking provided by the cloud datacenter.

11. A method for persisting application customization data, comprising:
obtaining, by a property store service executing on an edge computing device from a cloud container maintained by a cloud datacenter, a write lock;
downloading, by the property store service, a manifest for a property store database to update a local manifest of a local property cache on the edge computing device;
receiving, by the property store service, one or more requests from a module of an application to add, delete or modify properties that maintain the application customization data;
downloading any blocks affected by the request that are not already local from the property store database to the local property cache;
writing, by the property store service, to the local property cache to add, delete, or modify one or more blocks of the local property cache, and recording such additions, deletions, or modifications in the updated local manifest;
uploading, by the property store service, added or modified blocks to the property store database, and uploading the updated local manifest to replace the manifest in the cloud container; and
releasing the write lock back to the cloud container.

12. The method of claim 11, further comprising:
assigning each added or modified block a new block identifier (ID) in the updated local manifest,
wherein the uploading the updated local manifest adds new block IDs to the manifest in the cloud container and removes block IDs of deleted blocks from the manifest in the cloud container.

13. The method of claim 12, further comprising:
maintaining old blocks whose block ID is no longer in the manifest in the cloud container until a purge operation is periodically performed.

14. The method of claim 12, wherein the new block ID is a hash of contents of the added or modified block.

15. The method of claim 11, further comprising:
undoing changes to the property store database made by the added or modified blocks by rolling back the cloud container to a prior version using version tracking provided by the cloud datacenter.

16. The method of claim 11, further comprising:
receiving one or more requests from the module of the application including at least a property name;
reading, by the property store service, a value of the property corresponding to the property name from the local property cache; and
supplying the value of the property from the local property cache to the module of the application.

17. The method of claim 16, further comprising:
in response to the receiving one or more requests, downloading, by the property store service from the property store database to the local property cache, one or more blocks indicated in the local manifest that are required to read the property corresponding to the property name that are not already in the local property cache.

18. The method of claim 16, further comprising:
prefetching, by the property store service from the property store database to the local property cache, one or more blocks that are required to read the property corresponding to the property name prior to receiving the one or more requests for the property.

19. An edge computing device configured to persist application customization data, the edge computing device comprising:
3 a processor;
a memory coupled to the processor, the memory configured to maintain a local property cache for storing a portion of a property store database of a cloud container, a local manifest for the local property cache produced from a manifest in the cloud container, and software for a property store service that when executed on the processor is operable to:
service one or more requests from a module of an application for a property by downloading from the property store database to the local property cache any blocks indicated in the local manifest that are required to read the property that are not already local in the local property cache, reading the local property cache, and supplying at least a value of the property from the local property cache to the module of the application; and
service one or more requests from the module of the application to add, delete, or modify the property by obtaining a write lock, downloading the manifest in the cloud container to update the local manifest, writing to the local property cache to add, delete, or modify one or more blocks of the local property cache and recording such additions, deletions, or modifications to create an updated local manifest, uploading added or modified blocks to the property store database and uploading the updated local manifest to replace the manifest in the cloud container, and releasing the write lock back to the cloud container.

20. The edge computing device of claim 19, wherein the edge computing device is a client computing device, the module of the application is a backend module, and the memory of the client computing device further maintains software for the backend module, and the software for the property store service is further operable to pass the value of the property from the backend module to a frontend module of the application directly or via inter-process communication (IPC).

21. The edge computing device of claim 19, wherein the edge computing device is a virtual machine (VM) of a cloud datacenter, the module of the application is a backend module executed on the VM, and the software for the property store service is further operable to pass the value of the property from the backend module to a frontend module of the application executed on a client computing device as part of a remote procedure call (RPC) or representational state transfer (REST) application program interface (API).

22. A non-transitory computer readable media having software stored thereon, the software when executed by one or more processors of one or more computers being operable to:
obtain a write lock;
download a manifest for a property store database to update a local manifest of a local property cache;
receive one or more requests from an application to add, delete or modify properties that maintain application customization data;
download any blocks affected by the request that are not already local from the property store database to the local property cache;

write the local property cache to add, delete, or modify one or more blocks of the local property cache, and record such additions, deletions, or modifications in the updated local manifest;

upload added or modified blocks to the property store database, and upload the updated local manifest to update the manifest in the cloud container; and release the write lock back to the cloud container.

23. The non-transitory computer readable media of claim 22, wherein the software is further operable to:

assign each added or modified block a new block identifier (ID) in the updated local manifest, wherein the upload of the updated local manifest adds new block IDs to the manifest in the cloud container and removes block IDs of deleted blocks from the manifest in the cloud container.

24. The non-transitory computer readable media of claim 22, wherein the software is further operable to:

undo changes to the property store database made by the added or modified blocks by rolling back the cloud container to a prior version using version tracking.

25. The non-transitory computer readable media of claim 22, wherein the software is further operable to:

receive one or more requests from the application including at least a property name;

read a value of the property corresponding to the property name from the local property cache; and supply the value of the property from the local property cache to the application.

26. The non-transitory computer readable media of claim 25, wherein the software is further operable to:

in response to the receipt of the one or more requests, download, from the property store database to the local property cache, one or more blocks indicated in the local manifest that are required to read the property corresponding to the property name that are not already in the local property cache.

27. A non-transitory computer readable media having software stored thereon, the software when executed by one or more processors of one or more computers being operable to:

service one or more requests from a module of an application for a property by downloading from a property store database to a local property cache that stores a portion of the property store database any blocks indicated in a local manifest for the local property cache that are required to read the property that are not already local in the local property cache, reading the local property cache, and suppling at least a value of the property from the local property cache to the module of the application; and service one or more requests from the module of the application to add, delete, or modify the property by downloading a manifest in the cloud container to update the local manifest and synchronize the local property cache with the property store database, downloading from the property store database to the local property cache any blocks affected by the request to add, delete, or modify the property that are not already local in the local property cache, writing to the local property cache to add, delete, or modify one or more blocks of the local property cache and recording such additions, deletions, or modifications to create an updated local manifest, uploading added or modified blocks to the property store database, and uploading the updated local manifest to replace the manifest in the cloud container.

28. The non-transitory computer readable media of claim 27, wherein the software is further operable to:

assign each added or modified block a new block identifier (ID) in the updated local manifest, wherein the uploading of the updated local manifest adds new block IDs to the manifest in the cloud container and removes block IDs of deleted blocks from the manifest in the cloud container.

* * * * *

UNITED STATES PATENT AND TRADEMARK OFFICE
CERTIFICATE OF CORRECTION

| | | |
|---|---|---|
| PATENT NO. | : 12,321,792 B2 | Page 1 of 1 |
| APPLICATION NO. | : 18/097951 | |
| DATED | : June 3, 2025 | |
| INVENTOR(S) | : Keith A. Bentley | |

It is certified that error appears in the above-identified patent and that said Letters Patent is hereby corrected as shown below:

In the Claims

Claim 19:
Column 12, Line 6 reads:
"3 a processor;"
Should read:
-- a processor; --

Signed and Sealed this
Thirtieth Day of September, 2025

John A. Squires
*Director of the United States Patent and Trademark Office*